United States Patent
Gerard

(10) Patent No.: US 7,287,196 B2
(45) Date of Patent: Oct. 23, 2007

(54) MEASURING RELIABILITY OF TRANSACTIONS

(75) Inventor: Scott N. Gerard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 10/932,732

(22) Filed: Sep. 2, 2004

(65) Prior Publication Data

US 2006/0047992 A1 Mar. 2, 2006

(51) Int. Cl.
G06F 11/00 (2006.01)
(52) U.S. Cl. .................................. 714/45; 718/101
(58) Field of Classification Search .................. 714/45
See application file for complete search history.

(56) References Cited

U.S. PATENT DOCUMENTS 6,163,763 A * 12/2000 Cox et al. ..................... 703/17

2002/0062237 A1 * 5/2002 Matsumoto et al. ........... 705/7
2003/0046615 A1 * 3/2003 Stone ........................... 714/47
2004/0054500 A1 * 3/2004 Beverly et al. ............. 702/182
2004/0078691 A1 * 4/2004 Cirne et al. .................. 714/38
2005/0021708 A1 * 1/2005 Raghuraman et al. ...... 709/223

OTHER PUBLICATIONS

Miyamoto, Isao. "Software Reliability in Online Real Time Environmet". Jun. 1975. ACM SIGPLAN Notices. v. 10 n. 6. pp. 194-203.*

* cited by examiner

Primary Examiner—Scott Baderman
Assistant Examiner—Paul F. Contino
(74) Attorney, Agent, or Firm—Owen J. Gamon

(57) ABSTRACT

A method, apparatus, system, and signal-bearing medium that, in an embodiment, divide transactions performed by a program into groups, save data regarding duration times of the transactions in response to trace statements in the program, and determine a reliability of the groups of transactions based on the duration times and a number of failures of the transactions in the groups. The duration times are based on differences between start times and end times of the transactions, excluding differences between the suspend times and resume times of the transactions.

14 Claims, 9 Drawing Sheets

```
                        150
                   PROGRAM
                                    201
   RTRAN.PROGRAMSTART(PROGRAMID, VERSIONID)

202
   TRANA = NEW_TRAN()
   TRANA.BEGIN()
              205

IF FAILURE THEN    210
         TRANA.FAIL()

215
   TRANA.END()

216
   TRANB =NEW_TRAN()
   TRANB.BEGIN()
             220    225
   TRANB.SUSPEND()
         WAIT(10 SECONDS)
   TRANB.RESUME()
               230
              235
   TRANB.END()
                240
   RTRAN.PROGRAMEND
```

FIG. 2

RELIABILITY REPORT — 600

| GROUP (605) | SUBGROUP (610) | FAILURES (612) | HOURS-T (614) | MTTF-T (616) | LAMBDA-T (618) |
|---|---|---|---|---|---|
| A | A1 | 0 | 400 | 1200.0 | 0.00083 |
| A | A2 | 2 | 90 | 45.0 | 0.02222 |
| A | A3 | 0 | 10 | 30.0 | 0.03333 |
| B | B1 | 1 | 250 | 250.0 | 0.00400 |
| B | B2 | 2 | 100 | 50.0 | 0.02000 |
| B | B3 | 3 | 150 | 50.0 | 0.02000 |

FIG. 6A

RELIABILITY REPORT — 602

| GROUP (605) | SUBGROUP (610) | DUTY (620) | MTTF-P (622) | LAMBDA-P (624) | R-P(100) (626) |
|---|---|---|---|---|---|
| A | A1 | 0.40 | 3000.0 | 0.00033 | 0.9672 |
| A | A2 | 0.09 | 500.0 | 0.00200 | 0.8187 |
| A | A3 | 0.01 | 3000.0 | 0.00033 | 0.9672 |
| B | B1 | 0.25 | 1000.0 | 0.00100 | 0.9048 |
| B | B2 | 0.10 | 500.0 | 0.00200 | 0.8187 |
| B | B3 | 0.15 | 333.3 | 0.00300 | 0.7408 |

FIG. 6B

MEASURING RELIABILITY OF TRANSACTIONS

FIELD

An embodiment of the invention generally relates to computers. In particular, an embodiment of the invention generally relates to measuring the reliability of transactions.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware components (such as semiconductors, integrated circuits, programmable logic devices, programmable gate arrays, power supplies, electronic card assemblies, sheet metal, cables, and connectors) and software, also known as computer programs.

Computer programs often perform units of work, typically called transactions. Transactions may be performed by the computer program, or execution of the transactions may be distributed across multiple computer programs or across multiple computer systems. Further, transactions may request data from a variety of data sources, such as files, data structures, or databases, either on the same computer system or distributed across other computer systems. Transactions may fail, or not run to completion successfully, for a variety of reasons. For example, data may be temporarily unavailable or locked for use by another program, a computer system or network may be slow or unavailable due to a high load, or an error may occur.

Some failures may be expected while others are unexpected, success or failure may be subjective, and a condition that one program consider success another program may consider a failure. For example, a utility that opens files may report two different conditions: that the file was found and opened, or the file was not found. Both conditions are not be considered failures to the open utility because it performed its job correctly. Similarly, the program that invokes the open utility may simply create the file if it does not exist, so the invoking program also does not consider the file-not-found condition to be a failure. But, another program that invokes the open utility might interpret the file-not-found condition to mean that important data has been lost, so the transaction cannot continue.

Because of the importance of the success or failure of transactions, users would like to understand the reliability of transactions. The reliability of a transaction, or of a program that executes multiple transactions over a time interval (t), is the probability that the transaction or program can run without a failure over that time interval. Reliability is distinguished from availability, which is the probability that the program or system is correctly functioning at a particular point in time. Availability is usually expressed as a percentage of uptime.

The reliability of a program can change. For example, programmers often make changes to programs, creating different versions of the programs. The different versions may vary in reliability, and although programmers may have an intuitive feel for how the reliability has changed, they lack the ability to quantify the reliability.

Thus, without a better way to quantify reliability, users will continue to experience difficulty assessing the reliability of their computer programs.

SUMMARY

A method, apparatus, system, and signal-bearing medium are provided that, in an embodiment, divide transactions performed by a program into groups, save data regarding duration times of the transactions in response to trace statements in the program, and determine a reliability of the groups of transactions based on the duration times and a number of failures of the transactions in the groups. The duration times are based on differences between start times and end times of the transactions, excluding differences between the suspend times and resume times of the transactions. In an embodiment, the reliability is based on a mean time to failure for the program, where the mean time to failure for the program comprises a mean time to failure for a transaction group divided by duty cycle. The duty cycle is a total duration of the transaction group divided by a total duration of the program. In an embodiment, the groups may be further divided into subgroups.

BRIEF DESCRIPTION OF THE DRAWING

FIG. 2 depicts a block diagram of an example program, according to an embodiment of the invention.

FIG. 6A depicts a pictorial representation of an example reliability report generated by the report controller, according to an embodiment of the invention.

FIG. 6B depicts a pictorial representation of another example reliability report generated by the report controller, according to an embodiment of the invention.

DETAILED DESCRIPTION

Figure 1:
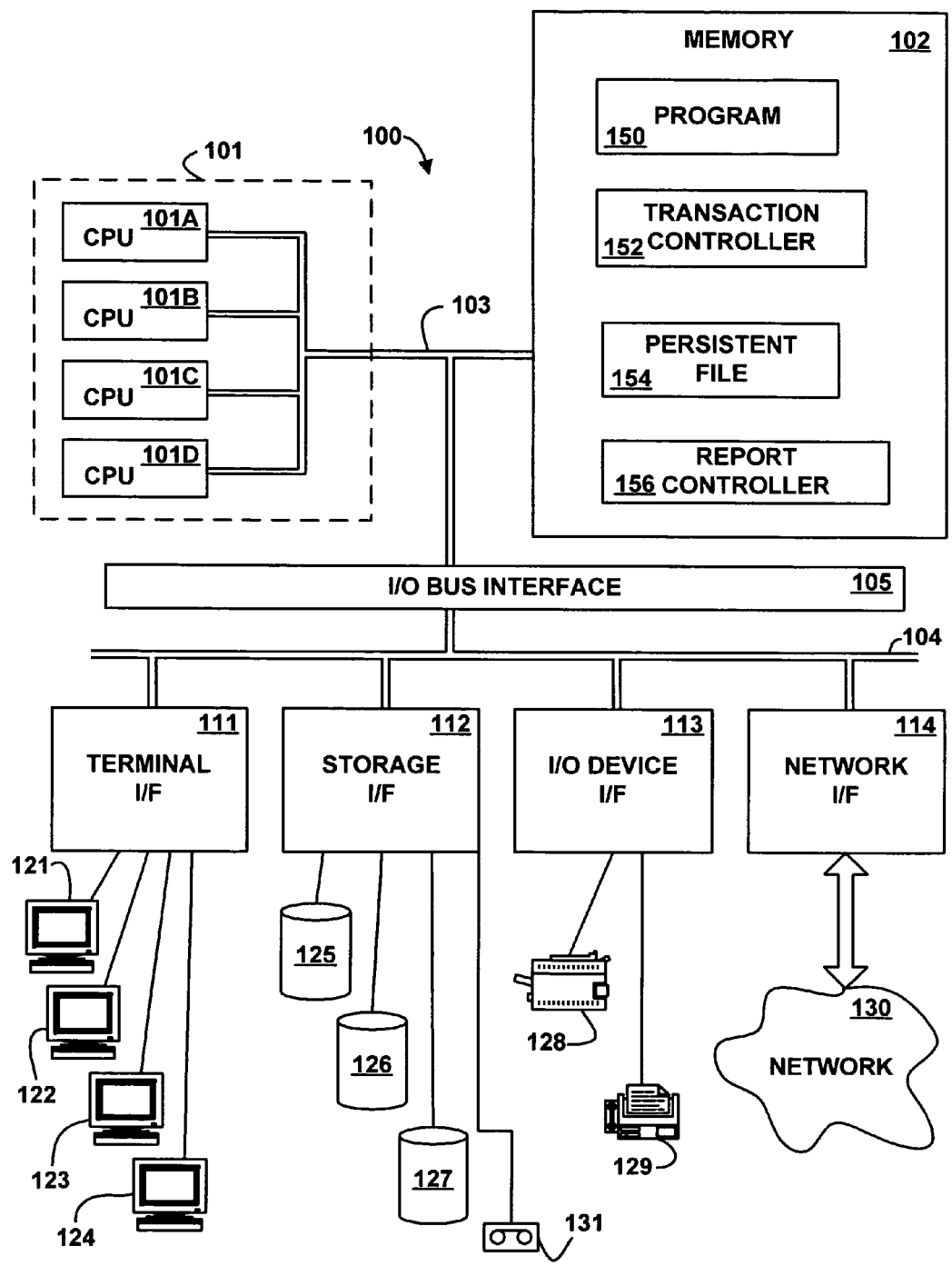
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a network 130, according to an embodiment of the present invention. The major components of the computer system 100 include one or more processors 101, main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment, the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a program 150, a transaction controller 152, a persistent file 154, and a report controller 156. Although the program 150, the transaction controller 152, the persistent file 154, and the report controller 156 are illustrated as being contained within the memory 102 in the computer system 100, in other embodiments, some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the program 150, the transaction controller 152, the persistent file 154, and the report controller 156 are all illustrated as being contained within the memory 102 in the computer system 100, these elements are not necessarily all completely contained in the same storage device at the same time.

The program 150 includes instructions or statements, whether in source or object form, that are capable of being interpreted or executed to perform transactions. The program 150 may created by a user, a programmer, or a third party. The program 150 may be an application or may be part of an operating system that controls the computer system 100. The program 150 is further described below with reference to FIG. 2.

The transaction controller 152 responds to trace statements or instructions in the program 150 to collect reliability data regarding the transactions performed by the program 150. The transaction controller 152 stores the reliability data in the persistent file 154. The persistent file 154 is further described below with reference to FIG. 3. The report controller 156 interprets the reliability data in the persistent file 154 to create the reliability report, as further described below with reference to FIGS. 6A and 6B.

In an embodiment, the program 150, the transaction controller 152, and the report controller 156 include instructions capable of executing on the processor 101 or statements capable of being interpreted by instructions executing on the processor 101 to perform the functions as further described below with reference to FIGS. 2, 3, 4A, 4B, 4C, 4D, 4E, 4F, 4G, 5, and 6. In another embodiment, the transaction controller 152 and/or the report controller 156 may be implemented in microcode. In yet another embodiment, the transaction controller 152 and the report controller 156 may be implemented in hardware via logic gates and/or other appropriate hardware techniques, in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiments, many other such devices may exist, which may be of differing types.

The network interface 114 provides one or more communications paths from the computer system 100 to other digital devices and computer systems, and such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact, the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments, some or all of the I/O devices are connected directly to one or more system I/O buses.

The computer system 100, depicted in FIG. 1, has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In an embodiment, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line, cable, or bus. In another embodiment, the network 130 may support the Ethernet IEEE (Institute of Electrical and Electronics Engineers) 802.3x specification.

In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the network 130 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of an example program 150, according to an embodiment of the invention. The program 150 includes example statements 201, 202, 205, 210, 215, 216, 220, 225, 230, 235, and 240, but the program 150 also includes other, unillustrated statements or instructions. The statements 201, 205, 210, 215, 220, 225, 230, 235, and 240 are all trace statements, in that they are not part of the purpose or function of the program 150; instead, the trace statements request the transaction controller 152 to save data in records in the persistent file 154 that describes the operation, purpose, or function of the program 150. Trace statements are typically capable of being enabled and disabled and are typically enabled during debug, testing, performance analysis, or failure analysis of the program 150 and are disabled during normal operation of the program 150.

The statement 201, when executed or interpreted, directs the transaction controller 152 to save data in the persistent file 154 indicating the start of the program 150.

The statement 202, when executed or interpreted, creates an object that indicates an instance of a transaction called A. The statement 205, when executed or interpreted, directs the transaction controller 152 to save data in the persistent file 154 indicating the start of the transaction A. The statement 210, when executed or interpreted, directs the transaction controller 152 to save data in the persistent file 154 indicating failure of the transaction A. The statement 215, when executed or interpreted, directs the transaction controller 152 to save data in the persistent file 154 indicating that the transaction A has ended.

The statement 216, when executed, creates an object that indicates an instance of a transaction called B. The statement 220, when executed or interpreted, directs the transaction controller 152 to save data in the persistent file 154 indicating the start of the transaction B. The statement 225, when executed or interpreted, directs the transaction controller 152 to save data in the persistent file 154 indicating that the execution of the transaction B has been suspended. The statement 230, when executed or interpreted, directs the transaction controller 152 to save data in the persistent file 154 indicating that execution of the transaction B has been resumed. The statement 235, when executed or interpreted, directs the transaction controller 152 to save data in the persistent file 154 indicating that transaction B has ended.

The statement 240, when executed or interpreted, directs the transaction controller 152 to save data in the persistent file 154 indicating the end of the program 150.

The trace statements 201, 205, 210, 215, 220, 225, 230, 235, and 240 may direct the transaction controller 152 via invocations, messages, events, requests, semaphores, shared data structures, interrupts, or any other appropriate mechanism. A programmer, debugger, or any appropriate user or program may insert the trace statements 201, 205, 210, 215, 220, 225, 230, 235, and 240 in the program 150 at any desired location.

Figure 3:
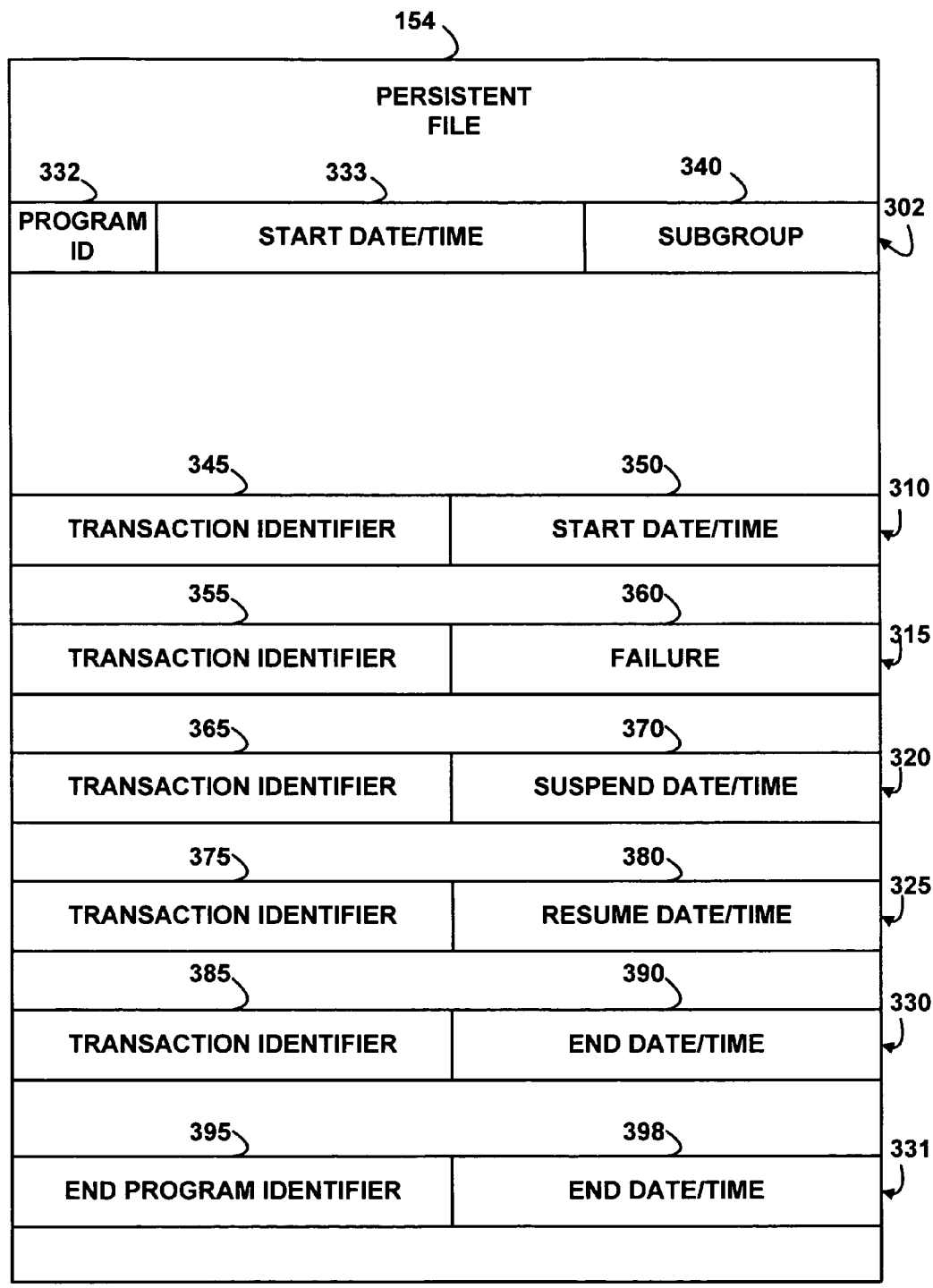
FIG. 3 depicts a block diagram of an example data structure for a persistent file, according to an embodiment of the invention.

FIG. 3 depicts a block diagram of an example data structure for the persistent file 154, according to an embodiment of the invention. The persistent file 154 includes example records 302, 310, 315, 320, 325, 330, and 331, but in other embodiments any number of records with any appropriate data may be present.

The transaction controller 152 logs the record 302 in response to the statement 201 of the program 150. The record 302 includes a start program identifier 332, which indicates that the record 302 is associated with the start of the program 150. The record 302 further includes a date/time 333, which indicates the date and/or time that the program 150 started. The record 302 further includes a subgroup field 340, which in various embodiments may indicate a version of the code in the program 150 used when the program is executed or any other appropriate subgroup.

The transaction controller 152 logs the record 310 in response to the beginning of a transaction as indicated, for example, by execution of the statement 205 in the program 150. The record 310 includes a transaction identifier 345 and a start date/time 350. The transaction identifier 345 identifies a transaction, e.g., transaction A or transaction B (FIG. 2), associated with the record 310. The start date/time 350 indicates the date and/or time that statement 205 was executed.

The transaction controller 152 logs the record 315 in response to the failure of a transaction as indicated, for example, by execution of the statement 210 in the program 150. The record 315 includes a transaction identifier 355 and a failure indicator 360. The transaction identifier 355 identifies a transaction, e.g., transaction A or transaction B (FIG. 2), associated with the record 315. The failure indicator 360 indicates the record 315 is associated with the failure statement 210.

The transaction controller 152 logs the record 320 in response to suspending a transaction, for example, by execution of the statement 225 in the program 150. The record 320 includes a transaction identifier 365 and a suspend date/time 370. The transaction identifier 365 identifies a transaction, e.g., transaction A or transaction B (FIG. 2), associated with the record 320. The suspend date/time 370 indicates the date and/or time that the statement 225 was executed.

The transaction controller 152 logs the record 325 in response to resuming a transaction, for example, by execution of the statement 230 in the program 150. The record 325 includes a transaction identifier 375 and a resume date/time 380. The transaction identifier 375 identifies a transaction, e.g., transaction A or transaction B (FIG. 2), associated with the record 325. The resume date/time 380 indicates the date and/or time that the statement 230 was executed.

The transaction controller 152 logs the record 330 in response to a transaction ending, for example, by execution of the statements 215 or 235 in the program 150. The record 330 includes a transaction identifier 385 and an end date/time 390. The transaction identifier 385 identifies a transaction, e.g., transaction A or transaction B (FIG. 2), associated with the record 330. The end date/time 390 indicates the date and/or time that the statement 215 or 235 was executed.

The transaction controller 152 logs the record 331 in response to the statement 240. The record 331 includes an end program identifier 395, which indicates that this record is associated with the end of the program 150, as indicated by the statement 240. The record 331 further includes a date/time 398, which indicates the date and/or time that the program 150 ended.

Figure 4A:
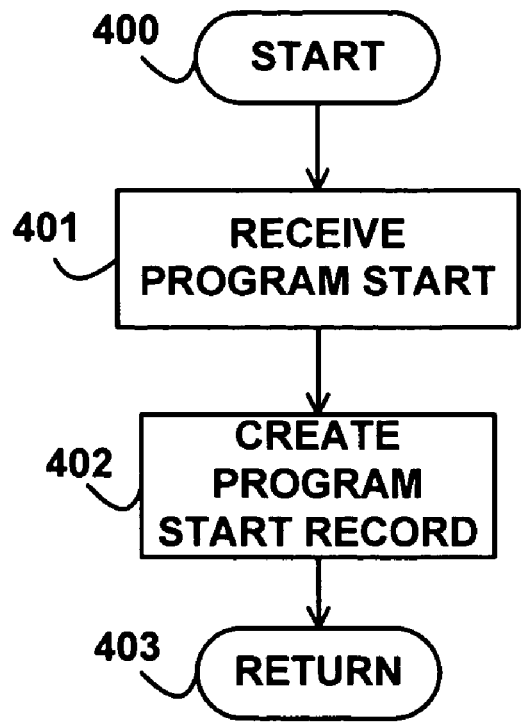
FIG. 4A depicts a flowchart of example processing for a transaction controller, according to an embodiment of the invention.

FIG. 4A depicts a flowchart of example processing for a transaction controller 152, according to an embodiment of the invention. Control begins at block 400. Control then continues to block 401 where the transaction controller 152 receives a program start event initiated by the statement 201 of the program 150 in FIG. 2. Control then continues to block 402 where the transaction controller 152 creates the program started record 302, as previously described above with reference to FIG. 3. Control then continues to block 403 where the logic of FIG. 4A returns.

Figure 4B:
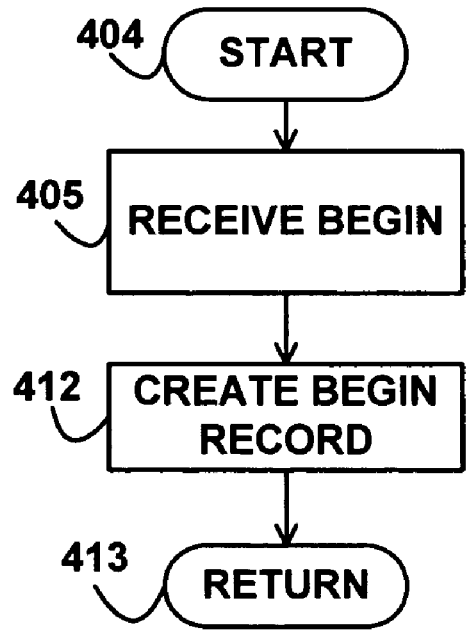
FIG. 4B depicts a flowchart of further example processing for the transaction controller, according to an embodiment of the invention.

FIG. 4B depicts a flowchart of further example processing for the transaction controller 152, according to an embodiment of the invention. Control begins at block 404. Control then continues to block 405 where the transaction controller 152 receives a begin event initiated by the statement 205 in the program 150 in FIG. 2. Control then continues to block 412 where the transaction controller 152 creates a record in the persistent file 154 that indicates that a transaction has been started, such as the record 310 (FIG. 3). The transaction controller 152 saves the transaction identifier 345 and the current time and/or date 350. Control then continues to block 413 where the logic of FIG. 4B returns.

Figure 4C:
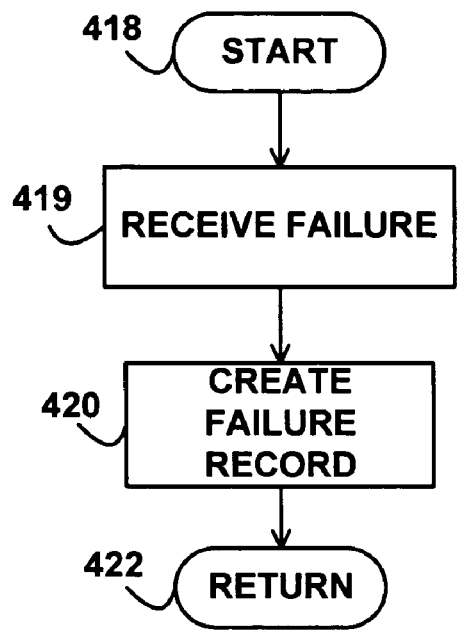
FIG. 4C depicts a flowchart of further example processing for the transaction controller, according to an embodiment of the invention.

FIG. 4C depicts a flowchart of further example processing for the transaction controller 152, according to an embodiment of the invention. Control begins at block 418. Control then continues to block 419 where the transaction controller 152 receives a failure event initiated by the statement 210 of the program 150 in FIG. 2. Control then continues to block 420 where the transaction controller 152 creates the record 315 in the persistent file 154, saves the transaction identifier 355 of the associated transaction, and saves the failure indicator 360, indicating that the associated transaction has failed. Control then continues to block 422 where the logic of FIG. 4C returns.

Figure 4D:
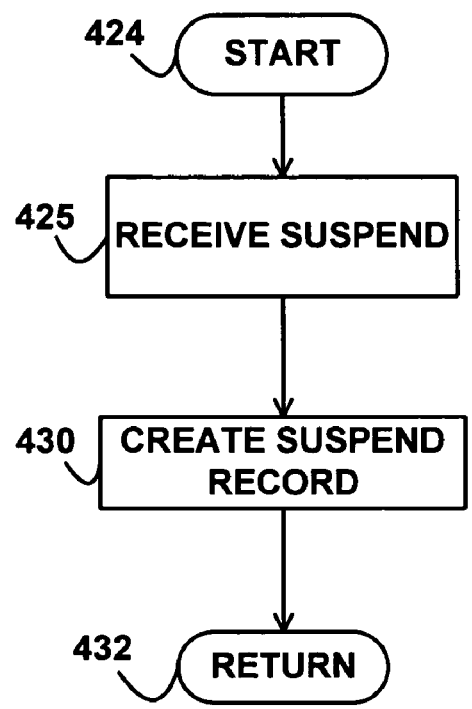
FIG. 4D depicts a flowchart of further example processing for the transaction controller, according to an embodiment of the invention.

FIG. 4D depicts a flowchart of further example processing for the transaction controller 152, according to an embodiment of the invention. Control begins at block 424. Control then continues to block 425 where the transaction controller 152 receives a suspend event initiated by the statement 225 in the program 150. Control then continues to block 430 where the transaction controller 152 creates the record 320 in the persistent file 154, saves the transaction identifier 365 of the associated transaction, and saves the suspend date/time 370, indicating that the associated transaction has been suspended. Control then continues to block 432 where the logic of FIG. 4D returns.

Figure 4E:
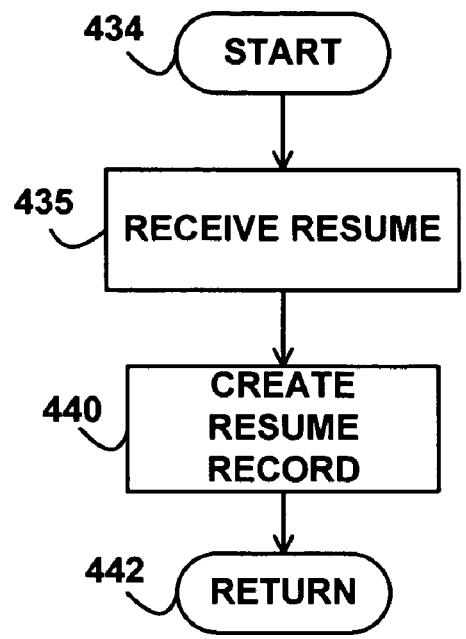
FIG. 4E depicts a flowchart of further example processing for the transaction controller, according to an embodiment of the invention.

FIG. 4E depicts a flowchart of further example processing for the transaction controller 152, according to an embodiment of the invention. Control begins at block 434. Control then continues to block 435 where the transaction controller 152 receives a resume event initiated by the statement 230 in the program 150. Control then continues to block 440 where the transaction controller 152 creates the record 325 in the persistent file 154, saves the transaction identifier 375 of the associated transaction, and saves the resume date/time 380, indicating that the associated transaction has been resumed. Control then continues to block 442 where the logic of FIG. 4E returns.

Figure 4F:
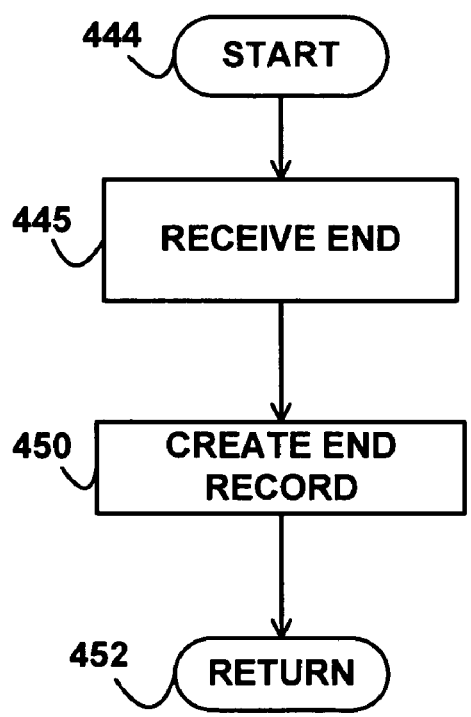
FIG. 4F depicts a flowchart of further example processing for the transaction controller, according to an embodiment of the invention.

FIG. 4F depicts a flowchart of further example processing for the transaction controller 152, according to an embodiment of the invention. Control begins at block 444. Control then continues to block 445 where the transaction controller 152 receives an end event initiated by the statements 215 or 235 in the program 150. Control then continues to block 450 where the transaction controller 152 creates the record 330 in the persistent file 154, saves the transaction identifier 385 of the associated transaction, and saves the end date/time 390. Control then continues to block 452 where the logic of FIG. 4F returns.

Figure 4G:
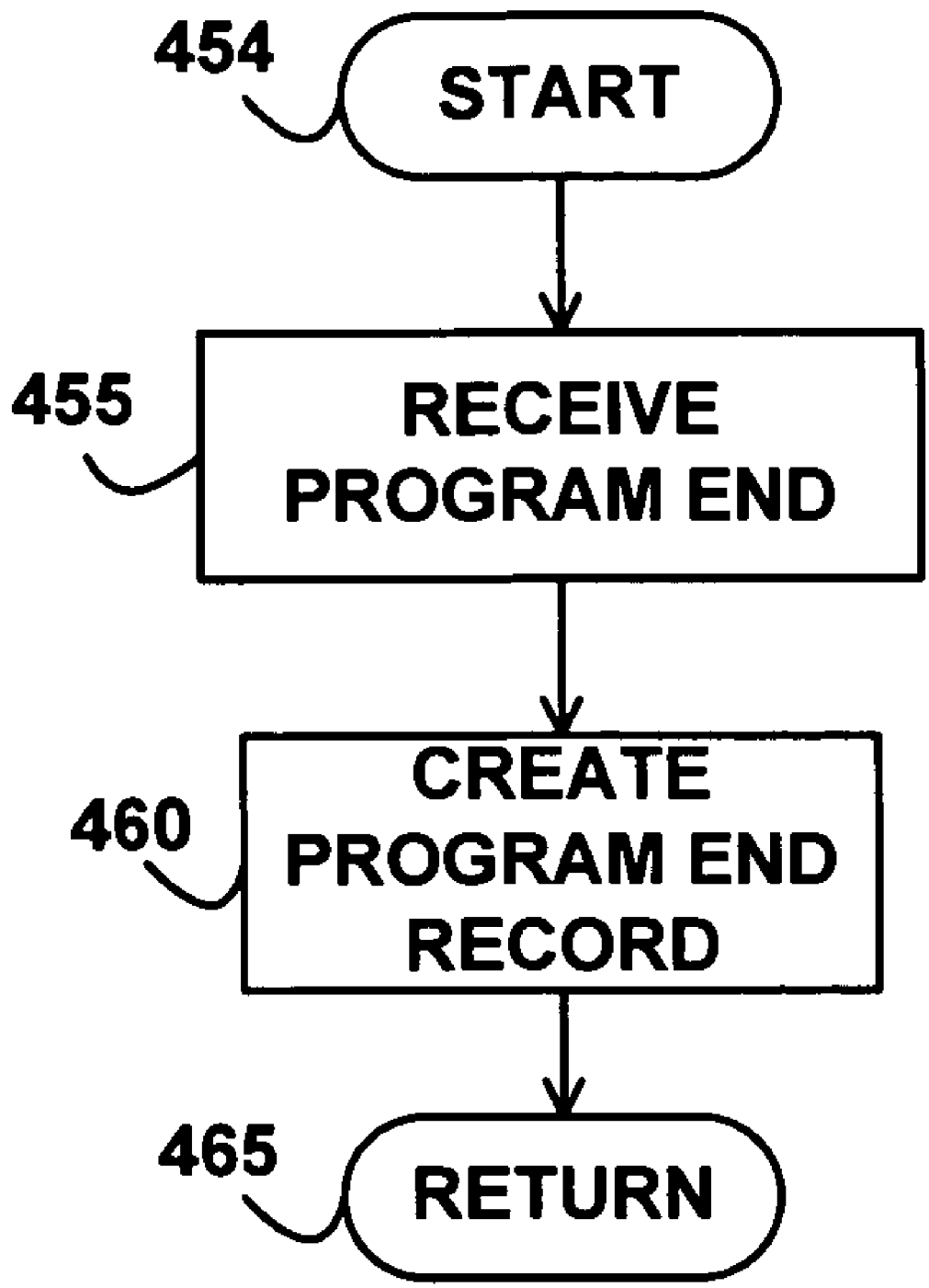
FIG. 4G depicts a flowchart of further example processing for the transaction controller, according to an embodiment of the invention.

FIG. 4G depicts a flowchart of further example processing for the transaction controller 152, according to an embodiment of the invention. Control begins at block 454. Control then continues to block 455 where the transaction controller 152 receives a program end event. Control then continues to block 460 where the transaction controller 152 creates the program end record 331, sets the end program identifier 395, and sets the end date/time 398 to indicate the time that the program 150 ended, as previously described above with reference to FIG. 3. Control then continues to block 465 where the logic of FIG. 4G returns.

Figure 5:
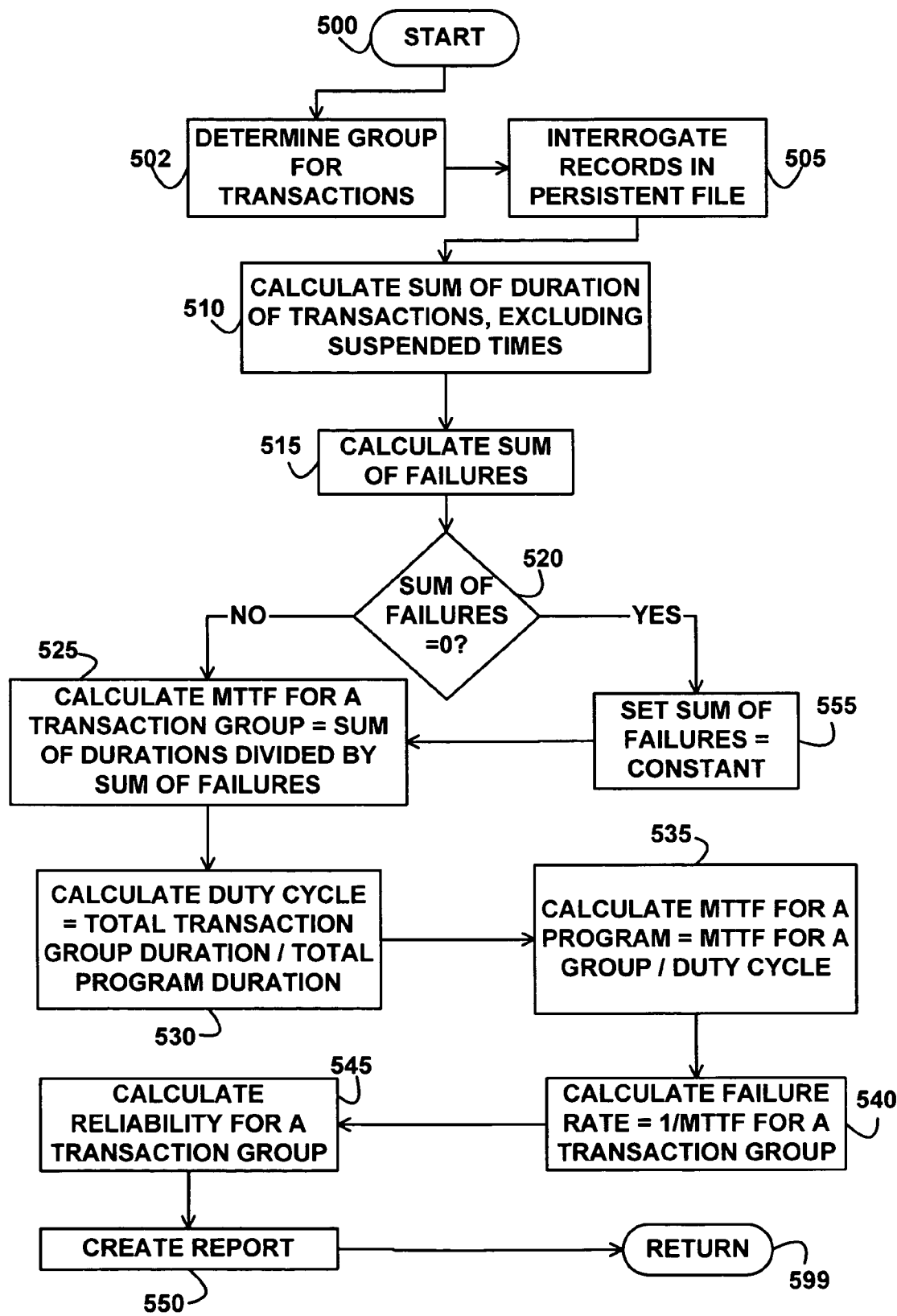
FIG. 5 depicts a flowchart of example processing for a report controller, according to an embodiment of the invention.

FIG. 5 depicts a flowchart of example processing for a report controller 156, according to an embodiment of the invention. Controller begins at block 500. Control begins at block 502 where the report controller 156 determines how to divide transactions into groups. In an embodiment, the transactions may be grouped by type, program identifier, version identifier, transaction identifier, date/time, or any other appropriate group. Further, in some embodiments, the transactions may have groups and subgroups. The report controller 156 may determine the group via a user interface or programmatically. Control then continues to block 505 where the report controller 156 interrogates records in the persistent file 154 in order to perform the following processing.

Control then continues to block 510 where the report controller 156 calculates the sum of the duration of all transactions, by group and subgroup, performed by the program 150, as identified in the persistent file 154, excluding suspended times. Thus, the time duration that a transaction was suspended is not included in the sum.

The duration of a transaction is the difference between the end date/time 390 and the start date/time 350 in records where the transaction identifier 385 and the transaction identifier 345 are identical, indicating that the records 330 and 310 are associated with the same transaction. The suspended time of a transaction is the difference between the resume date/time 380 and the suspend date/time 370 in records where the transaction identifier 375 and the transaction identifier 365 are identical, indicating that the records 325 and 320 are associated with the same transaction.

Although the duration time of a transaction is described herein, in other embodiments, the number of calls per failure, or any other measure whether determined by the program 150 and passed as a parameter or determined via any other appropriate technique may be used.

Control then continues to block 515 where the report controller 156 calculates the sum of the number of transactions performed by the program 150 that failed, by group and subgroup. A failure of a transaction is indicated by the presence of the record 315, as previously described above with reference to FIG. 3.

Control then continues to block 520 where the report controller 156 determines whether the sum of the failures is zero. If the determination at block 520 is true, then the sum of the failures is zero, so control continues to block 555 where the report controller 156 sets the sum of the failures to be a constant, e.g. ⅓, but in other embodiments any appropriate constant may be used. Control then continues to block 525 where the report controller 156 calculates the failure rate for a transaction group to be the sum of the durations (excluding suspended times) divided by the sum of the failures. Thus, the mean time to failure $MTTF_t$=total transaction group duration/sum of the failures.

Control then continues to block 530 where the report controller 156 calculates the duty cycle to be the total transaction group duration/total program duration. The total transaction group duration is the durations of all the transactions in the group (excluding the suspended times). The total program duration is based on the difference between the end date/time 398 in the record 331 and the date/time 333 in the record 302, as previously described above with reference to FIG. 3.

Control then continues to block 535 where the report controller 156 calculates the mean time to failure for a transaction group while the program 150 is running, $MTTF_p=MTTF_t/$(the duty cycle).

Control then continues to block 540 where the report controller 156 calculates the failure rate for each transaction group, $\lambda_t=1/MTTF_t$, (the reciprocal of $MTTF_t$) and the failure rate for a transaction group while the program 150 is running, $\lambda_p=1/MTTF_p$ (the reciprocal of $MTTF_p$).

Control then continues to block 545 where the report controller 156 calculates the reliability (R) for a transaction group for a specific amount of time (t), $R_p(t)=e^{-\lambda_p t}$. In various embodiments, the amount of time (t) may be hours, seconds, number of calls, or any other appropriate measure (used consistently throughout the calculations) and may be specified by a user or determined programmatically.

Control then continues to block 550 where the report controller 156 creates the report as further described below with reference to FIGS. 6A and 6B. Control then continues to block 599 where the logic of FIG. 5 returns.

If the determination at block 520 is false, then the number of the failures is not zero, so control continues to block 525, as previously described above.

FIG. 6A depicts a pictorial representation of an example reliability report 600 generated by the report controller 156, according to an embodiment of the invention. The reliability report 600 includes a group name field 605, a subgroup field 610, a number of failures field 612, a time (t) field 614, a MTTF$_t$ field 616, and a λ$_t$ field 618. But, in other embodiments, more or fewer fields may be present. The group name field 605 identifies a group of transactions performed by the program 150, such as the group A and the group B. The subgroups field 610 identifies versions of the program 150 that are used when executing the transactions, or any other appropriate type of subgroup. The failures 612 indicates the number of failures that occurred in the time period indicated in the time (t) field 614. The MTTF$_t$ field 616 indicates the mean time to failure, as previously calculated above with reference to block 525 in FIG. 5. The λ$_t$ field 618 indicates the failure rate, as previously calculated above with reference to block 540 in FIG. 5.

FIG. 6B depicts a pictorial representation of an example reliability report 602 generated by the report controller 156, according to an embodiment of the invention. The reliability report 602 includes a group name field 605, a subgroup field 610, a duty cycle field 620, a MTTF$_p$ field 622, a λ$_p$ field 624, and a R$_p$(t) field 626. But, in other embodiments more or fewer fields may be present, including some or all of the fields represented in FIG. 6A. The group name field 605 identifies a group of transactions performed by the program 150, such as the group A and the group B. The subgroups field 610 identifies versions of the program 150 that are used when executing the transactions, or any other appropriate type of subgroup. The calculation of the values in the duty cycle field 620 was previously described above with reference to block 530 in FIG. 5. The calculation of the values in the MTTF$_p$ field 622 was previously described above with reference to block 535 in FIG. 5. The calculation of the λ$_p$ field 624 was previously described above with reference to block 540 in FIG. 5. The calculation of the R$_p$(t) (in the example of FIG. 6B, t=100) field 626 was previously described above with reference to block in FIG. 5.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized, and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    dividing transactions performed by a program into groups;
    saving data regarding duration times of the transactions in response to trace statements in the program; and
    determining a reliability of the groups of transactions based on the duration times and a number of failures of the transactions in the groups, wherein the determining further comprises determining the reliability based on a duty cycle, wherein the duty cycle comprises a total duration of the group divided by a total duration of the program, wherein the determining further comprises determining the reliability based on a mean time to failure, wherein the mean time to failure comprises a mean time to failure for a transaction group divided by the duty cycle, wherein the mean time to failure for a transaction group comprises a sum of the duration times divided by the number of failures.

2. The method of claim 1, wherein the saving further comprises:
    saving start times and end times of the transactions.

3. The method of claim 2, wherein the duration times are based on differences between the start times and end times.

4. The method of claim 2, wherein the saving further comprises:
    saving suspend times and resume times of the transactions.

5. The method of claim 4, wherein the duration times are based on differences between the start times and end times, excluding differences between the suspend times and resume times.

6. An apparatus comprising:
    means for dividing transactions performed by a program into groups;
    means for saving data regarding duration times of the transactions in response to trace statements in the program; and
    means for determining a reliability of the groups of transactions based on the duration times and a number of failures of the transactions in the groups, wherein the means for determining further comprises means for determining the reliability based on a duty cycle, wherein the duty cycle comprises a total duration of the group divided by a total duration of the program, wherein the means for determining further comprises means for determining the reliability based on a mean time to failure, wherein the mean time to failure comprises a mean time to failure for a transaction group divided by the duty cycle, wherein the mean time to failure for a transaction group comprises a sum of the duration times divided by the number of failures.

7. The apparatus of claim 6, wherein the means for determining further comprises:
    means for determining the reliability for different subgroups of the program.

8. The apparatus of claim 6, wherein the means for determining further comprises:
    means for determining the reliability based on a reciprocal of the mean time to failure.

9. A storage medium encoded with instructions, wherein the instructions when executed comprise:
    dividing transactions performed by a program into groups;
    saving data regarding duration times of the transactions in response to trace statements in the program; and
    determining a reliability of the groups of transactions based on the duration times and a number of failures of the transactions in the groups, wherein the duration times are based on differences between start times and end times of the transactions, excluding differences between suspend times and resume times of the transactions, wherein the determining further comprises determining the reliability based on a duty cycle, wherein the duty cycle comprises a total duration of the group divided by a total duration of the program, wherein the determining further comprises determining the reliability based on a mean time to failure for the program, wherein the mean time to failure for the program comprises a mean time to failure for a transaction group divided by the duty cycle, wherein the failure rate comprises a sum of the duration times divided by the number of failures.

10. The storage medium of claim 9, wherein the determining further comprises:
   determining the reliability for different subgroups of the program.

11. The storage medium of claim 9, wherein the determining further comprises:
   determining the reliability based on a reciprocal of the mean time to failure.

12. A computer system comprising:
   a processor; and
   memory encoded with instructions, wherein the instructions when executed on the processor comprise:
   dividing transactions performed by a program into groups,
   saving data regarding duration times of the transactions in response to trace statements in the program, and
   determining a reliability of the groups of transactions based on the duration times and a number of failures of the transactions in the groups, wherein the duration times are based on differences between start times and end times of the transactions, excluding differences between suspend times and resume times of the transactions, wherein the determining further comprises determining the reliability based on a duty cycle, wherein the duty cycle comprises a total duration of the group divided by a total duration of the program, wherein the determining further comprises determining the reliability based on a mean time to failure for the program, wherein the mean time to failure for the program comprises a mean time to failure for the transaction group divided by the duty cycle, wherein the mean time to failure for the transaction group comprises a sum of the duration times divided by the number of failures.

13. The computer system of claim 12, wherein the determining further comprises:
   determining the reliability for different subgroups of the program.

14. The computer system of claim 12, wherein the determining further comprises:
   determining the reliability based on a reciprocal of the mean time to failure for the program.

* * * * *